(12) United States Patent
Hawkins (10) Patent No.: US 10,817,851 B2
(45) Date of Patent: Oct. 27, 2020

(54) SYSTEM AND METHOD FOR CASHLESS GAMING

(75) Inventor: Ryan Paul Hawkins, Coffs Harbour (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 955 days.

(21) Appl. No.: 12/976,270

(22) Filed: Dec. 22, 2010

(65) Prior Publication Data

US 2011/0151966 A1 Jun. 23, 2011

(30) Foreign Application Priority Data

Dec. 23, 2009 (AU) .............................. 2009906263

(51) Int. Cl.
*G06Q 20/04* (2012.01)
*G07F 17/32* (2006.01)

(52) U.S. Cl.
CPC ....... *G06Q 20/045* (2013.01); *G07F 17/3225* (2013.01); *G07F 17/3227* (2013.01); *G07F 17/3244* (2013.01); *G07F 17/3248* (2013.01)

(58) Field of Classification Search
CPC ...... G07F 17/34; G07F 17/32; G07F 17/3225; G07F 17/3227; G07F 17/3244; G07F 17/3248; G06Q 20/045
USPC ........ 463/25, 42, 20, 26, 16, 29; 705/17, 35, 705/41; 235/379
See application file for complete search history.

(56) References Cited

U.S. PATENT DOCUMENTS

| | | | |
|---|---|---|---|
| 5,265,874 A * | 11/1993 | Dickinson et al. | ............. 463/25 |
| 5,489,101 A | 2/1996 | Moody | |
| 5,697,843 A | 12/1997 | Manship et al. | |
| 5,984,779 A | 11/1999 | Bridgeman et al. | |
| 6,652,380 B1 * | 11/2003 | Luciano | ......................... 463/25 |
| 6,962,530 B2 | 11/2005 | Jackson | |
| 7,036,012 B2 * | 4/2006 | Charrin | ......................... 713/169 |
| 7,094,149 B2 | 8/2006 | Walker et al. | |
| 2002/0161645 A1 | 10/2002 | Walker et al. | |
| 2003/0078094 A1 | 4/2003 | Gatto et al. | |
| 2003/0211886 A1 * | 11/2003 | Buchanan et al. | ............... 463/29 |
| 2004/0147309 A1 * | 7/2004 | Chamberlain et al. | ......... 463/25 |
| 2005/0082758 A1 | 4/2005 | Sklansky | |
| 2005/0130728 A1 * | 6/2005 | Nguyen | .................. G07F 17/32 463/16 |
| 2005/0143169 A1 * | 6/2005 | Nguyen | .................. G07F 17/32 463/25 |
| 2005/0167924 A1 | 8/2005 | Sklansky | |

(Continued)

FOREIGN PATENT DOCUMENTS

| CA | 2085460 A1 | 6/1994 |
|---|---|---|
| CA | 2504494 A1 | 10/2006 |

(Continued)

OTHER PUBLICATIONS

AU Patent Examination Report for AU Application No. 2016203481, dated Nov. 20, 2017. 3 Pages.

*Primary Examiner* — Chase E Leichliter
(74) *Attorney, Agent, or Firm* — Armstrong Teasdale LLP (57) ABSTRACT

A cashless gaming method including receiving payment for a selected gaming ticket having a predefined fixed value, the gaming ticket being redeemable at a cashless-enabled gaming machine for an associated amount of wagerable credits, and issuing the fixed value gaming ticket to the player responsive to receiving the payment.

19 Claims, 6 Drawing Sheets

(56) References Cited

U.S. PATENT DOCUMENTS

| | | |
|---|---|---|
| 2005/0282626 A1 | 12/2005 | Manfredi |
| 2006/0066051 A1 | 3/2006 | Nicely |
| 2006/0068897 A1* | 3/2006 | Sanford .............. G06Q 20/403 463/25 |
| 2006/0073888 A1* | 4/2006 | Nguyen ................ G07F 17/32 463/27 |
| 2006/0142078 A1 | 6/2006 | Walker et al. |
| 2006/0186600 A1 | 8/2006 | Sklansky |
| 2006/0189367 A1* | 8/2006 | Nguyen ................ G07F 17/32 463/16 |
| 2006/0211475 A1 | 9/2006 | Walker et al. |
| 2006/0211476 A1 | 9/2006 | Walker et al. |
| 2006/0211477 A1 | 9/2006 | Walker et al. |
| 2006/0211493 A1* | 9/2006 | Walker ................ G06Q 30/02 463/29 |
| 2006/0242020 A1 | 10/2006 | Walker et al. |
| 2007/0010320 A1 | 1/2007 | Toyoda |
| 2007/0271194 A1 | 11/2007 | Walker et al. |
| 2008/0176646 A1* | 7/2008 | Kelly ................ G07F 17/3244 463/25 |
| 2008/0274783 A1* | 11/2008 | Walker ................ G07F 17/32 463/13 |
| 2008/0274792 A1* | 11/2008 | Walker ................ G07F 17/32 463/25 |
| 2009/0082082 A1* | 3/2009 | Carr-Gregg ........... G07F 17/32 463/20 |
| 2010/0222132 A1* | 9/2010 | Sanford ................ G06Q 30/02 463/25 |
| 2011/0183745 A1* | 7/2011 | Gagner ................ G07F 17/32 463/25 |
| 2011/0201408 A1* | 8/2011 | Gagner ................ G06Q 20/04 463/25 |

FOREIGN PATENT DOCUMENTS

| | | |
|---|---|---|
| GB | 1447550 | 8/1976 |
| WO | 2005048164 A1 | 5/2005 |
| WO | 2006033840 A2 | 3/2006 |
| WO | 2006072942 A2 | 7/2006 |

* cited by examiner

SYSTEM AND METHOD FOR CASHLESS GAMING

RELATED APPLICATIONS

This application claims priority to Australian Provisional Application No. 2009906263, having a filing date of Dec. 23, 2009, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates generally to a system and method for cashless gaming and more particularly, but not exclusively, to harm minimisation techniques utilising cashless-enabled gaming machines.

Traditionally, gaming machines have been fitted with coin and/or note acceptors which allow players to exchange monies for credits wagerable on the gaming machine. As will readily be appreciated, it is difficult to control player spend on such gaming machines since there is no way of tracking an amount of monies wagered by any particular player on the gaming machine.

An increasing number of gaming venues now implement so called "cashless" systems whereby credit can be stored against a player's account for subsequent redemption. One such cashless system is referred to as the ticket-in ticket-out (TITO) system whereby a ticket issued at one gaming machine can be redeemed at another gaming machine or at a cashier station.

While such cashless gaming systems allow a player's wagering habits to be better tracked, current techniques for subsequently controlling player spend based on the monitored wagering habits have proved ineffective.

BRIEF SUMMARY OF THE INVENTION

In a first aspect, the invention provides a cashless gaming method comprising: receiving payment for a selected gaming ticket having a predefined fixed value, the gaming ticket being redeemable at a cashless-enabled gaming machine for an associated amount of wagerable credits; and issuing the fixed value gaming ticket to the player responsive to receiving the payment.

In an embodiment, the method comprises the further step of allowing the player to select from one of a plurality of gaming tickets having distinct predefined fixed values.

In an embodiment, the method comprises the further step of evaluating dispensing criteria and allowing selection of gaming tickets in accordance with the dispensing criteria.

In an embodiment, the dispensing criteria specifies a maximum spend value, such that the ticket(s) available for selection must not have a value which exceeds the maximum spend value.

In an embodiment, the method comprises the further step of determining an identity of the player, such that the maximum spend value is associated with the identified player.

In an embodiment, the method comprises the further step of evaluating an amount of credits wagered by the player over a predefined period of time, such that the ticket(s) available for selection must not have a value which, when combined with the evaluated wager amount, exceeds the maximum spend value.

In an embodiment, the method comprises the further step of evaluating a cashless credit balance associated with the player, such that the tickets available for selection must not have a value which, when combined with the cashless credit balance, exceeds the maximum spend value.

In an embodiment, the method comprises the further step of allowing at least one of the player and game venue to set the maximum spend value.

In accordance with a second aspect of the present invention, there is provided a cashless gaming method comprising: receiving a player selection for a gaming ticket having a predefined fixed value; issuing the gaming ticket to a player responsive to confirming receipt of payment for the ticket; and authorising the gaming ticket to be redeemed for a corresponding amount of credit at a cashless-enabled gaming machine, in response to determining that a dispensing criteria has been met.

In an embodiment, the dispensing criteria is that a particular amount of credits wagered by the player over a specified time period has not been exceeded.

In accordance with a third aspect, the present invention provides a ticketing system for a gaming venue comprising at least one cashless-enabled gaming machine, the system comprising: an input module allowing the player to select a gaming ticket having a predefined fixed value, the gaming ticket being redeemable at the least one cashless-enabled gaming machine for an associated amount of wagerable credits; a payment module arranged to receive payment for the selected ticket; and a ticket dispenser arranged to dispense the selected ticket.

In an embodiment, the input module is further arranged to allow a player to select from one of a plurality of gaming tickets having distinct fixed predefined values.

In an embodiment, the ticketing system further comprises an evaluation module arranged to evaluate a dispensing criteria to determine which, if any, of the plurality of gaming tickets are selectable by the player.

In an embodiment, the dispensing criteria specifies a maximum spend value for the player, such that the selectable ticket(s) must not have an associated value which exceeds the maximum spend value.

In an embodiment, the ticketing system further comprises a communications module arranged to receive the maximum spend value from a player tracking system.

In an embodiment, the maximum spend value is associated with the player and recorded against a player record maintained by the player tracking system.

In an embodiment, the evaluation module is further arranged to evaluate an amount of credits wagered by the player over a predefined period of time, such that the ticket(s) available for selection must not have a value, when combined with the accumulated wager amount, exceeds the maximum spend value.

In an embodiment, the evaluation module is further arranged to evaluate a number of credits associated with the player that are yet to be redeemed, such that the tickets available for selection must not have a value which, when combined with at least one of the accumulated wager and yet to be redeemed credit value, exceeds the maximum spend value.

A gaming system comprising a ticketing system in accordance with the third aspect and at least one cashless-enabled gaming machine on which the dispensed ticket(s) can be redeemed.

In accordance with a fourth aspect of the present invention, there is provided a computer program comprising at least one instruction which when implemented by a computer system is arranged to cause the system to implement the method according to the first and/or second aspects.

In accordance with a fifth aspect, the present invention comprising a computer readable medium storing a computer program product in accordance with the fourth aspect.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Embodiments relate to a ticketing system for a gaming venue comprising at least one cashless-enabled gaming machine. The ticketing system comprises an input module allowing a player to select a gaming ticket having a predefined fixed value, the gaming ticket being redeemable at the at least one cashless-enabled gaming machine for an associated amount of wagerable credits. A ticket dispenser is provided for dispensing the predefined fixed value gaming ticket to the player, responsive to receiving payment for the ticket (by way of a payment module). It will be understood that a number of tickets having distinct predefined fixed values may be available for selection. For example, the ticketing system may be configured to dispense $5, $10, $20 and $50 tickets. It will be understood that the number of selectable tickets may vary for different venues as may the actual predefined fixed ticket values.

It will also be understood that the input module, payment module and ticket dispenser may be incorporated into a standalone ticketing device which is separate of the cashless-enabled gaming machines, or alternatively may be incorporated into the cashless-enabled gaming machines themselves. Alternatively the modules may be incorporated individually or collectively into other elements of the gaming network (e.g. into a cashier station, etc). In an embodiment, the ticketing system interfaces with a player tracking system for retrieving player related data which may be evaluated for determining which tickets are available for selection by a player (e.g. dependent on maximum spend limits set for/by the player, etc.).

Figure 1:
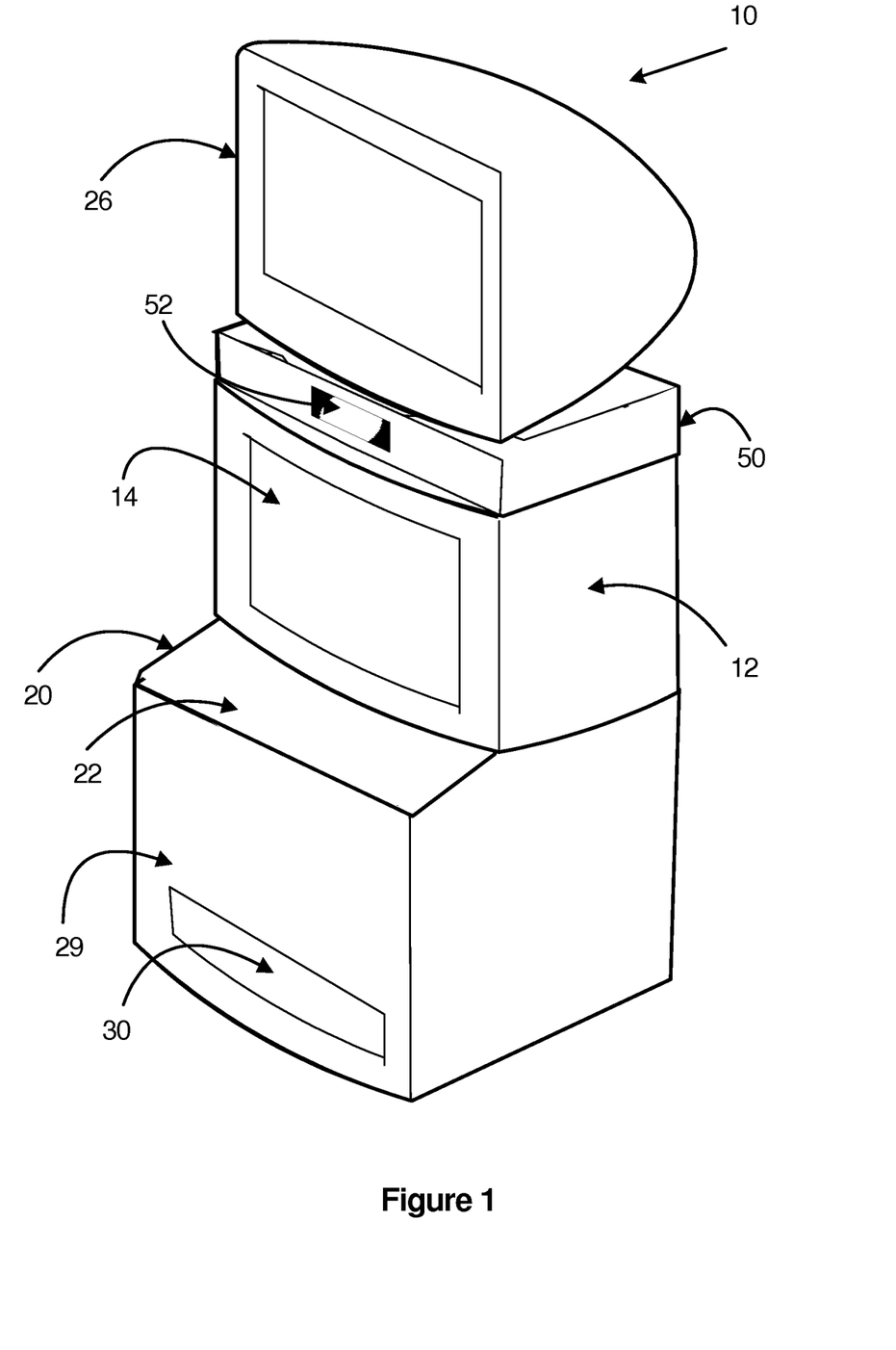
FIG. 1 is a perspective view of a gaming machine of the embodiment.

An exemplary cashless-enabled gaming machine 10 is illustrated in FIG. 1. The gaming machine 10 includes a console 12 having a display 14 on which is displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism in the form of a ticket reader for reading the tickets. Depending on the desired implementation, other credit input mechanisms may also be included, for example, coin input chute and/or a bill collector for receiving monies in a conventional manner.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a display which may be of the same type as the display 14, or of a different type.

A player marketing module (PMM) 50 having a display 52 is connected to the cashless-enabled gaming machine 10. PMMs are also know as player tracking models (PTMs) or by their trade names—e.g. sentinel. The PMM 50 allows the player to interact with a player tracking system. As will be described in more detail in subsequent paragraphs, the PMM 50, among other things, advantageously allows for tracking and communication of player spend data to a ticketing system which can in turn be evaluated for determining which tickets (used for cashless gaming) are available for selection by a particular player.

The PMM 50 has a magnetic card reader for the purpose of reading a player tracking device in the form of a magnetic swipe card. However other reading devices may be employed and the player tracking device may be in the form of a card, flash drive or any other portable storage medium capable of being read by a reading device.

Figure 2:
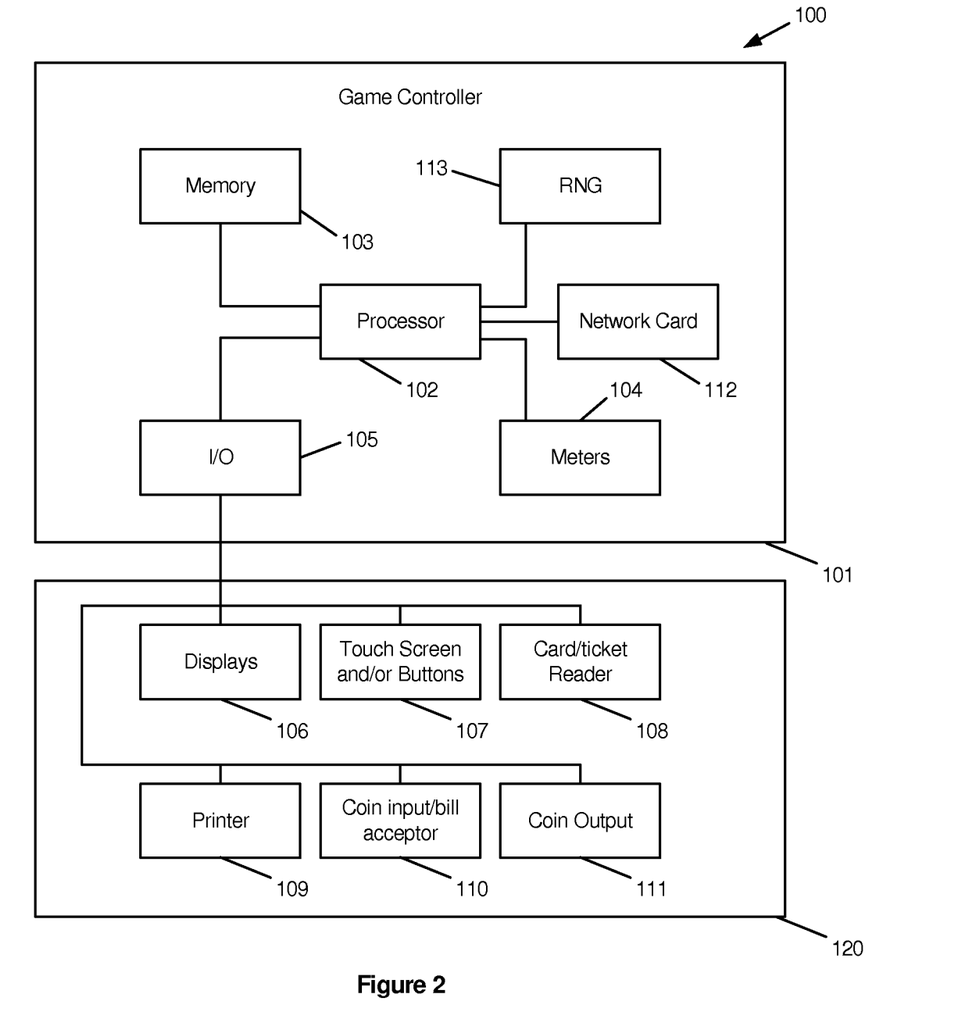
FIG. 2 is a block diagram of a gaming machine of the embodiment.

FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102. Herein the term "processor" is used to refer generically to any device that can process game play instructions in accordance with game play rules and may include: a microprocessor, microcontroller, programmable logic device or other computational device, a general purpose computer (e.g. a PC) or a server.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit and spend (as previously described), an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 has one or more displays 106, a touch screen and/or buttons 107, a card and/or ticket reader 108 (as previously mentioned capable of reading the fixed price tickets), a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card or serial communications port(s) 112.

Figure 3:
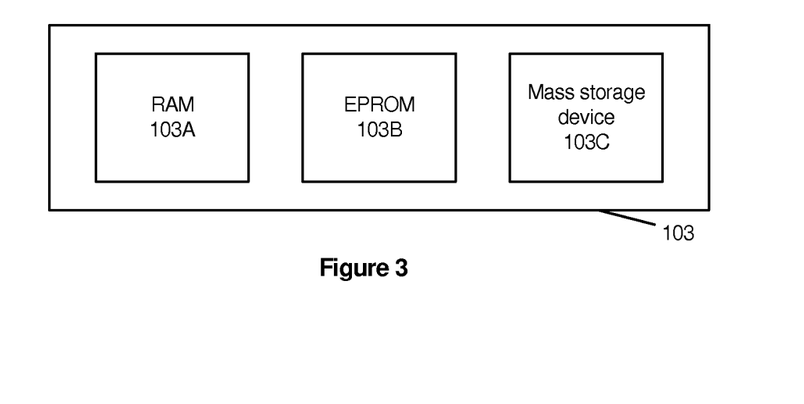
FIG. 3 is a block diagram of the memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In an embodiment, the game controller 101 may be arranged to control play of a spinning reel-type game on the gaming devices 10. Gaming systems for implementing games that involve a display of spinning reels that is part of the display of the outcome of a game have either a video display or a mechanical display, these latter machines most usually being "stepper" machines which have a separate motor for each reel. However, a person skilled in the art will appreciate that the invention can be implemented in respect of other forms of games, including card games, board draw games (e.g. Bingo or Keno), dice games, pinball games, and the like.

Figure 4:
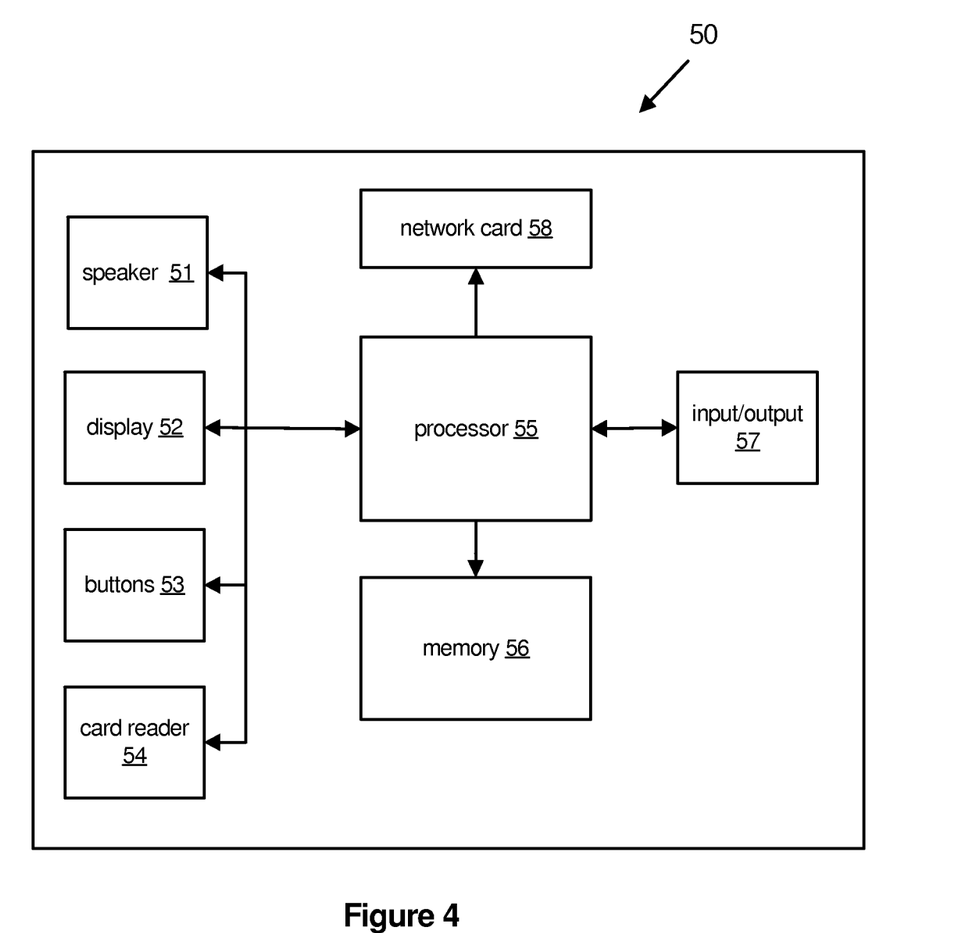
FIG. 4 is a block diagram of a player marketing module.

FIG. 4 is a block diagram of an exemplary player marketing module 50. The PMM 50 is connected via input/output port 57 to a serial input output port of the input/output section 105 of the electronic gaming machine. The player marketing module has a card reader 54 and a display 52 which may be a touch screen display. The PMM 50 may also have buttons 53 for receiving a player input (at least in embodiments where there is no touch screen display) and a speaker 51. Input received from the card reader 54 is processed by processor 55 based on the data stored in memory 56. The PMM 50 is connected to the player tracking system by a network card 58.

Processor 55 is also arranged to communicate with gaming machine 10 via input output port 57 to cause locking of the gaming machine in response to an instruction received via the network card 58.

Figure 5:
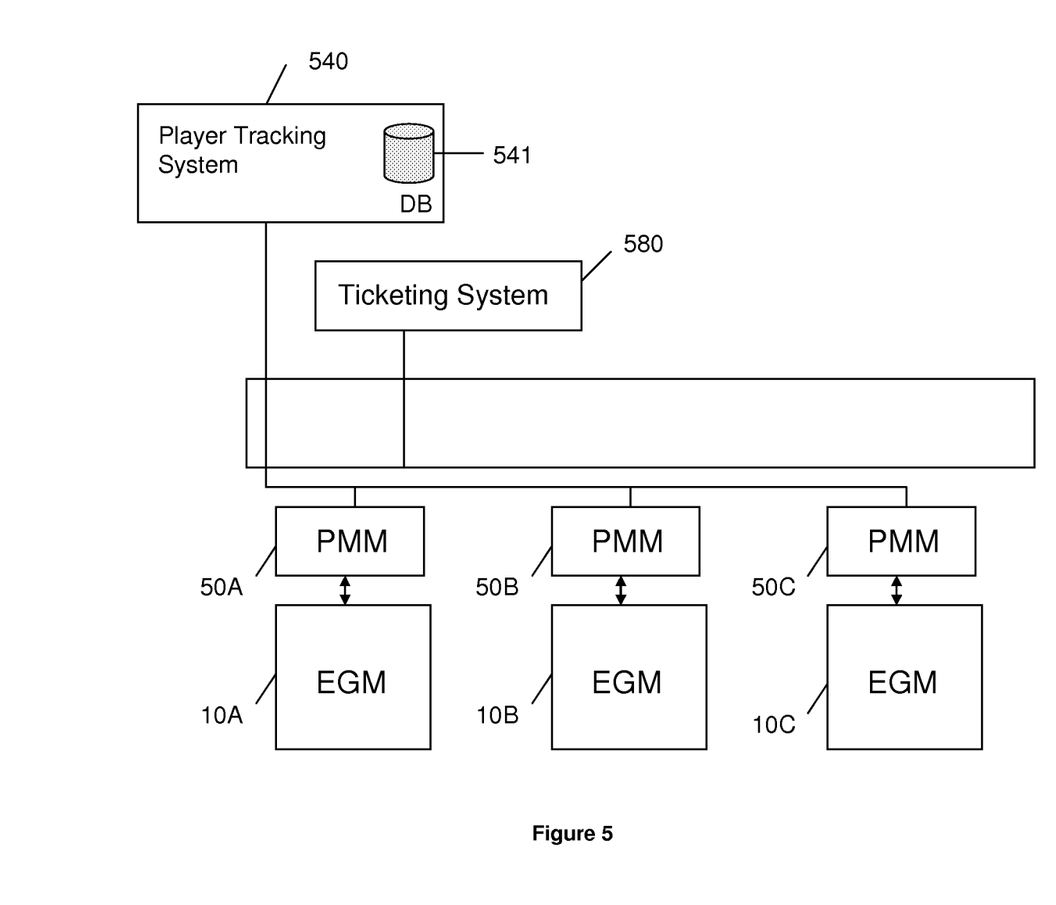
FIG. 5 is a block diagram showing how a plurality of gaming machines are connected to a player tracking system and ticketing system.

FIG. 5 shows a series of electronic gaming machines 10 connected via respective player marketing modules 50 over a communications network 510, to a player tracking system 540. A player database 541 is coupled to the player tracking system 540 which provides a data structure for storing player records including accumulated player spend values for specified time periods, which has been communicated by the individual PMMs and which may be evaluated by the ticketing system 580 for determining tickets available for selection by a particular player. The communications network 510 may be any suitable communications network, for example an Ethernet network.

When a player registers for the player tracking system 540 they provide details such as their name, age, address and phone number. In an embodiment, the player may also specify dispensing criteria such as maximum spend limits for particular time periods. For example, the player may set themselves a daily $50 maximum spend limit which is recorded by the player tracking system 540 and stored in the database 541. It will be understood that in some embodiments, the venue may be allowed to set maximum spend limits for particular players and this data may also be provided to the player tracking system 540.

The player tracking system 540 uses the above details to create a player record for the player which is stored in the player database 541. The content of the player record may vary from implementation for implementation, but can include by way of example, the following fields: player identifier; dispensing criteria; accumulated player spend for a plurality of predefined time periods (e.g. daily, weekly, monthly etc.); checked in/checked out; current tracking system identifier (when checked out); points balance; cashless balance; name; age; address; phone number; e-mail address; reward entitlements; and transaction history.

The player is issued a player tracking device such as a magnetic stripe card, thermal card, smart card, or the like on which is recorded the player identifier. After being issued the card, the player uses the card and the player's record is periodically updated based on the player's activity. The activities which are monitored by the tracking system 540 will vary depending on implementation but in the illustrated embodiment include, for example, number of games played, amount wagered, amount won, amount spent at venue restaurant, points transactions, cashless transactions, a reward entitlement etc. After a period of time, the points balance and cashless balance will have current values. For example, when the player enters their card at PMM 50, the player's record could be updated to indicate the machine they have played, the amount they wagered for a particular period of time, the number of points awarded for their play, and an amount added to the cashless balance by the player when cashing out of the machine. The updated data is then stored in the database 541 in association with the player identifier.

Figure 6:
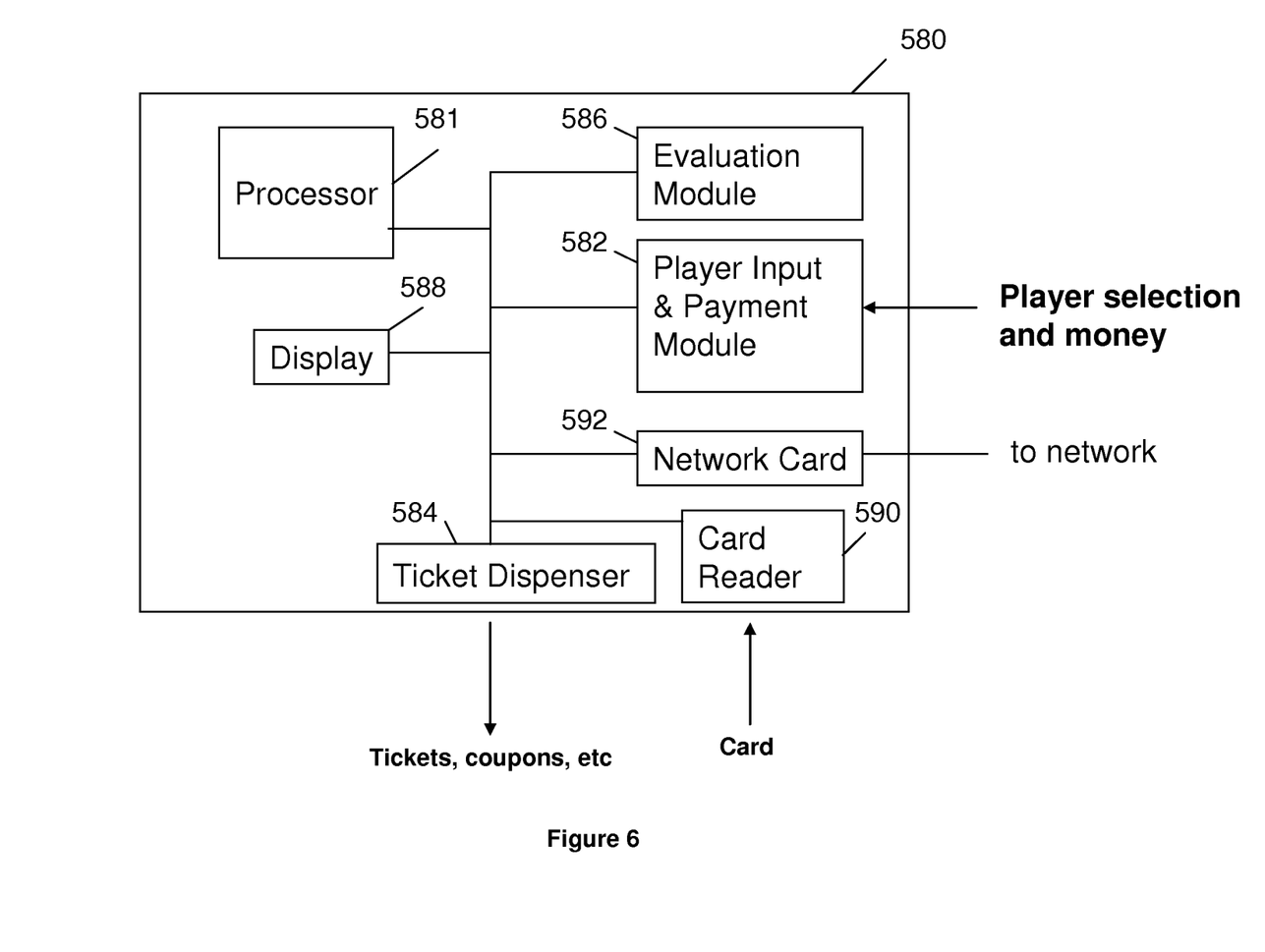
FIG. 6 is a block diagram of the ticketing system illustrated in FIG. 5.

The ticketing system 580 and operation thereof will be described in more detail with reference to FIG. 6. As previously mentioned, the ticketing system 580 is operable to dispense tickets having predefined fixed values (hereafter "fixed price tickets") to players. An advantage of such a fixed price ticketing system is that players are provided with a limited number of options for purchasing credits (e.g. the player may only be allowed to select one of a $5, $10 or $20 ticket, rather than the player being allowed to purchase any number of credits as afforded by conventional cashless gaming systems). Further, since there is no credit or overdraft facility associated with the fixed price ticket, the player is unable to continue wagering without returning to purchase a further fixed price ticket which may or may not be allowed, as further described below.

In order to achieve the aforementioned functionality, the ticketing system 580 includes a processor 581 arranged to implement a player input module 582 for allowing a player to select and purchase a particular fixed price ticket, and a ticket dispenser 584 which dispenses the selected ticket. In the presently described embodiment, the ticket dispenser

584 is arranged to dispense $5, $10, $20 and $50 fixed price tickets. It will be understood by persons skilled in the art, however, that a greater or fewer number of fixed price tickets may be held and dispensed by the ticket dispenser 584 and that the value of the fixed price tickets may be other than described above. For example, in an embodiment, only one fixed price ticket (e.g. a $25 ticket) may be dispensed.

In an embodiment, not all tickets dispensable by the ticket dispenser 584 may be available for selection by a player. According to such an embodiment the ticketing system 580 may further implement an evaluation module 586 arranged to evaluate spend data in accordance with dispensing criteria stored against the player record in the database 541, for determining selectable tickets.

In the presently described embodiment, the dispensing criteria requires that the player can only select a ticket which has a fixed value that does not exceed a maximum spend limit imposed by either the player or gaming venue. The spend limit may, for example, be for a particular time period (e.g. a $50 limit maximum spend per day) and may take into consideration an amount already wagered or otherwise gambled/spent by the player for that period. An amount of credits stored against the player account but yet to be redeemed (commonly referred to as a cashless balance) may also be taken into consideration when determining which fixed price tickets are available for selection.

Other dispensing criteria are envisaged. For example, the criteria may be that the player is only able to purchase tickets of a particular value (e.g. a player may only ever be allowed to purchase $10 tickets, irrespective of whether the ticket dispenser is arranged to dispense greater or lesser value fixed price tickets). Again, the associated spend data required for evaluation may be stored in the player tracking database 541, for subsequent retrieval by the ticketing system 580.

In order to obtain the dispensing criteria related to the player purchasing the ticket (and any relevant player data), the ticketing system 580 implements a player identification module 590 in the form of a card reader.

The card reader 590 (which may be in the same form as the card reader implemented by the PMMs) is arranged to read a player's tracking device for determining a player identifier. Once determined, the player identifier is communicated to the player tracking system 540 (utilising network card 592) with a request to receive the dispensing criteria for the identified player and any relevant spend data (e.g. spend limit, accumulated wager for associated time period, cashless balance, etc). Once received, the data is communicated to the evaluation module 586 which evaluates the data to determine which, if any, of the fixed value tickets are available for selection by the identified player.

Figure 7:
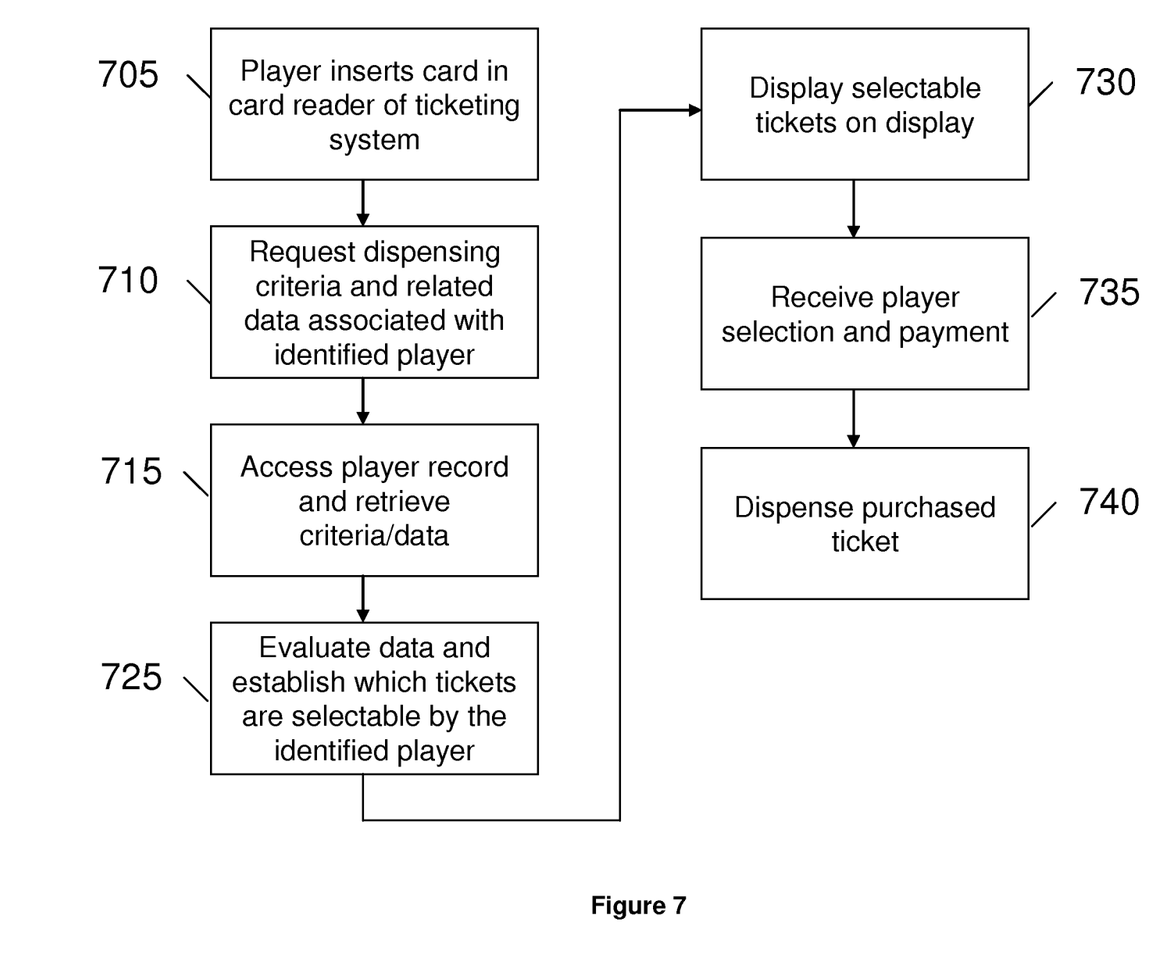
FIG. 7 is a flow chart of an embodiment.

The method of an embodiment is summarised in FIG. 7. The method 700 involves a player inserting (step 705) a tracking card in a card reader 590 of the ticketing system 580. The ticketing system 580 issues (710) a request to the player tracking system 540 including the player identifier. The player tracking system 540 processes the request and accesses the associated player record (715) stored in database 541. The related details are then communicated back to the ticketing system 580 for evaluation by the evaluation module 586 (720). At 725, the evaluation module establishes which, if any, of the fixed price tickets dispensable by the ticket dispenser 584 are able to be selected by the player. This is subsequently displayed (730) on the video display 588. At step 735, the player selects one of the selectable tickets and deposits the necessary funds via the player input module 582 to purchase the ticket. The ticket is then dispensed (step 740) and is ready to be redeemed for a corresponding amount of credits in any of the cashless-enabled gaming machines 10.

In an alternative embodiment to that described above, the ticketing system may not evaluate player related data and instead allow any player to select any of the dispensable tickets. According to such an embodiment, steps 705 to 730 may be omitted.

In a further embodiment the ticketing system may maintain a database storing validation numbers assigned to each dispensable ticket which may be read by the ticket readers 108 (i.e. when a player is attempting to redeem the credits on the gaming machine). The validation numbers may be communicated to the ticketing system 580, once read, for confirmation that the ticket is valid (e.g. by checking the number read by the ticket reader against the numbers stored in the database) prior to adding the associated credits to the credit meter 104.

In a further embodiment, rather than using a player tracking device a biometric system may be implemented whereby a player provides biometric information to the system to thereby identify themselves to the player tracking system (e.g. using a fingerprint scanner, etc.).

Further aspects of the method will be apparent from the above description of the gaming system. Persons skilled in the art will also appreciate that the method could be embodied in program code. The program code could be supplied in a number of ways, for example on a computer readable medium, such as a disc or a memory (for example, that could replace part of memory 103) or as a data signal (for example, by downloading it from a server).

It will be understood that in an embodiment, physical media other than tickets may be dispensed from the ticketing system. For example, the ticketing system may issue cards, tokens or other suitable media that are readable by the cashless enabled gaming machines, or the PMM coupled thereto. For example, in an embodiment, the player tracking device may also be operable to store the credits such that a player may insert the player tracking device into the card reader of the ticketing system and the selected fixed price ticket value is subsequently credited to the player account accessible using the player tracking device. Suitable databases maintaining credit values for individual players may be required to be implemented via either the ticketing system or player tracking system, as will be appreciated by a person skilled in the art.

In a further embodiment, the dispensing criteria may be established by the gaming venue (i.e. independently of the player). For example, at selected times, or in response to certain events, the gaming venue may impose restrictions on the tickets available for selection by all or some of the players. Such alternative embodiments are within the purview of the skilled person.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A cashless gaming method for use with a gaming system including i) a player tracking system, ii) a plurality of gaming machines, each gaming machine having a gaming controller (GC), a credit input device, and a player tracking module (PTM) that includes a PTM memory, a PTM processor configured to execute instructions stored in the PTM memory, a PTM display, a PTM serial port, a PTM reader device, a PTM network communications interface, and a PTM input interface, wherein the gaming controller includes a GC memory, a GC processor configured to execute instructions stored in the GC memory, a GC display, a GC input interface, and a GC serial port in communication with the PTM serial port, and iii) a ticketing module (TM) that includes a TM memory, a TM processor configured to execute instructions stored in the TM memory, a ticket dispensing device, a TM display, a TM reader device, a TM network communications interface, and a TM input interface, the TM processor configured to implement a maximum spend limit that is imposed upon a player, the method comprising:

receiving, by the PTM processor of a first of the gaming machines, an input from the PTM reader device of the first gaming machine, the input including a player identifier of the player;

retrieving, by the PTM processor of the first gaming machine via the PTM network communications interface of the first gaming machine from the player tracking system, a credit balance associated with the player identifier, wherein the player tracking system includes a player tracking database storing a plurality of records each associated with one of a plurality of player identifiers;

receiving, by the GC processor of the first gaming machine, a credit input from the credit input device of the first gaming machine, and adding a value of the credit input to the credit balance of the player;

receiving, by the GC processor of the first gaming machine, a game initialization input from the GC input interface of the first gaming machine, the game initialization input including a wager amount of at least a portion of the credit balance;

executing, by the GC processor of the first gaming machine, at least one game in response to the game initialization input, wherein the credit balance is reduced by the wagering amount;

transmitting, by the PTM processor of the first gaming machine to the player tracking system via the PTM network communications interface of the first gaming machine, the wagering amount and a wagering time, wherein the wagering amount and the wagering time are added to a spending record of wagering amounts and wagering times of the player in the player tracking database;

receiving, by the TM processer, an input from the TM reader device, the input including the player identifier of the player and a request to purchase a gaming ticket;

retrieving, by the TM processor via the TM network communications interface from the player tracking database, the spending record of the player and the maximum spend limit associated with the player;

comparing, by the TM processor, a difference between the spending record of the player and the maximum spend limit of the player to each of i) a first predefined fixed value of a first fixed price gaming ticket ii) a second predefined fixed value of a second fixed price gaming ticket, and iii) a third predefined fixed value of a third fixed price gaming ticket, wherein the second predefined fixed value of the second fixed price gaming ticket is less than the first predefined fixed value of the first fixed price gaming ticket, and wherein the third predefined fixed value of the third fixed price gaming ticket is less than the second predefined fixed value of the second fixed price gaming ticket;

determining, by the TM processor and based upon the comparing, that the difference exceeds the first predefined fixed value and does not exceed the second predefined fixed value, wherein the determination is independent of a current balance of funds in a player account of the player;

displaying, by the TM processor via the TM display, the second fixed price gaming ticket and the third fixed price gaming ticket as available for purchase by the player;

receiving, by the TM processor via the TM input interface, a selection from the player of at least one of the displayed fixed price gaming tickets for purchase;

receiving, by the TM processor via a TM payment module in communication with the ticketing module, payment for the selected fixed price gaming ticket, the selected fixed price gaming ticket being redeemable at a cashless-enabled gaming machine for a corresponding amount of wagerable credits;

generating, by the TM processor, updated spending record data in the player tracking database based on the predefined fixed value of the selected fixed price gaming ticket;

and issuing, from the ticket dispensing device, the selected fixed price gaming ticket to the player responsive to receiving the payment.

2. The cashless gaming method as claimed in claim 1, further comprising evaluating, by the TM processor, an amount of credits wagered by the player over a predefined period of time.

3. The cashless gaming method as claimed in claim 1, further comprising determining, by the TM processor, which of the plurality of fixed price gaming tickets are available for purchase in accordance with a cashless credit balance.

4. The cashless gaming method as claimed in claim 1, and further comprising receiving, by the TM processor, the maximum spend limit that is to be imposed upon the player from at least one of the player and a gaming venue.

5. The cashless gaming method as claimed in claim 1, further comprising displaying, by the TM processor via the TM display, only fixed price tickets available for purchase.

6. The cashless gaming method as claimed in claim 1, wherein receiving the payment for the selected fixed price ticket comprises receiving the payment from the TM payment module installed in one of the plurality of gamine machines.

7. The cashless gaming method as claimed in claim 1, wherein receiving the payment for the selected fixed price ticket comprises receiving the payment from the TM payment module installed in a standalone ticketing device in networked communication with the player tracking system.

8. A ticketing system comprising a ticketing module (TM) and at least one electronic gaming machine (EGM), the EGM comprising:

a credit input device;

a player tracking module (PTM) comprising a PTM processor, a PTM memory, a PTM display, a PTM serial port, a PTM reader device, a PTM network communications interface, and a PTM input interface, the PTM processor configured to execute instructions stored in the PTM memory, which when executed, cause the PTM processor to at least:

receive an input from the PTM reader device, the input including a player identifier of a player;

retrieve, via the PTM network communications interface from a player tracking system, a credit balance associated with the player identifier, wherein the player tracking system includes a player tracking database storing a plurality of records each associated with one of a plurality of player identifiers; and a game controller (GC) comprising a GC processor, a GC memory, a GC display, a GC input interface, and a GC serial port in communication with the PTM serial port, the GC processor configured to execute instructions stored in the GC memory, which when executed, cause the GC processor to:

receive a credit input from the credit input device and add a value of the credit input to the credit balance of the player;

receive a game initialization input from the GC input interface, the game initialization input including a wager amount of at least a portion of the credit balance; and execute at least one game in response to the game initialization input, wherein the credit balance is reduced by the wagering amount;

wherein the instructions stored in the PTM memory further cause the PTM processor to at least:

transmit, via the PTM network communications interface, the wagering amount and a wagering time to the player tracking system, wherein the wagering amount and the wagering time are added to a spending record of wagering amounts and wagering times of the player in the player tracking database; and wherein the ticketing module comprises a TM processor, a TM memory, a ticket dispensing device, a TM display, a TM reader device, a TM network communications interface, and a TM input interface, the TM processor configured to execute instructions stored in the TM memory, which when executed, cause the TM processor to at least:

receive an input from the TM reader device, the input including the player identifier of the player and a request to purchase a gaming ticket;

retrieve, via the TM network communications interface from the player tracking database, the spending record of the player and a maximum spend limit associated with the player;

compare a difference between the spending record of the player and the maximum spend limit of the player to each of i) a first predefined fixed value of a first fixed price gaming ticket ii) a second predefined fixed value of a second fixed price gaming ticket, and iii) a third predefined fixed value of a third fixed price gaming ticket, wherein the second predefined fixed value of the second fixed price gaming ticket is less than the first predefined fixed value of the first fixed price gaming ticket, and wherein the third predefined fixed value of the third fixed price gaming ticket is less than the second predefined fixed value of the second fixed price gaming ticket;

determine, based upon the comparing, that the difference exceeds the first predefined fixed value and does not exceed the second predefined fixed value, wherein the determination is independent of a current balance of funds in a player account of the player;

display, via the TM display, the second fixed price gaming ticket and the third fixed price gaming ticket as available for purchase by the player;

receive, via the TM input interface, a player selection of at least one of the displayed fixed price gaming tickets for purchase;

receive payment for the selected fixed price gaming ticket via a TM payment module, the selected fixed price gaming ticket being redeemable at a cashless-enabled gaming machine for a corresponding amount of wagerable credits;

generate updated spending record data in the player tracking database based on the predefined fixed value of the selected fixed price gaming ticket; and issue the selected fixed price gaming ticket via the ticket dispenser to the player responsive to receiving the payment.

9. The system as claimed in claim 8, wherein the maximum spend limit associated with the player specifies a maximum number of credits that can be wagered by the player over a specified time period.

10. The system as claimed in claim 8, wherein the TM reader device is the PTM reader device, and wherein the TM payment module is the credit input device of the EGM.

11. The system as claimed in claim 8, wherein the TM reader device and the TM payment module are implemented in a standalone ticketing device in networked communication with the player tracking system, the standalone ticketing device separate from the EGM.

12. A system comprising:

a plurality of electronic gaming machines (EGMs) each comprising:

a credit input device;

a player tracking module (PTM) comprising a PTM processor, a PTM memory, a PTM display, a PTM serial port, a PTM reader device, a PTM network communications interface, and a PTM input interface, the PTM processor configured to execute instructions stored in the PTM memory, which when executed, cause the PTM processor to at least:

receive an input from the PTM reader device, the input including a player identifier of a player;

retrieve, via the PTM network communications interface from a player tracking system, a credit balance associated with the player identifier, wherein the player tracking system includes a player tracking database storing a plurality of records each associated with one of a plurality of player identifiers; and a game controller (GC) comprising a GC processor, a GC memory, a GC display, a GC input interface, and a GC serial port in communication with the PTM serial port, the GC processor configured to execute instructions stored in the GC memory, which when executed, cause the GC processor to:

receive a credit input from the credit input device and add a value of the credit input to the credit balance of the player;

receive a game initialization input from the GC input interface, the game initialization input including a wager amount of at least a portion of the credit balance; and execute at least one game in response to the game initialization input, wherein the credit balance is reduced by the wagering amount;

wherein the instructions stored in the PTM memory further cause the PTM processor to at least:

transmit, via the PTM network communications interface, the wagering amount and a wagering time to the player tracking system, wherein the wagering amount and the wagering time are added to a spending record of wagering amounts and wagering times of the player in the player tracking database;

a player tracking system in communication with the plurality of EGMs; and a ticketing module configured to communicate with the player tracking system, the ticketing module (TM) comprising a TM processor, a TM memory, a ticket dispensing device, a TM display, a TM reader device, a TM network communications interface, and a TM input interface, the TM processor configured to execute instructions stored in the TM memory, which when executed, cause the TM processor to at least:

receive an input from the TM reader device, the input including the player identifier of the player and a request to purchase a gaming ticket;

retrieve, via the TM network communications interface from a player tracking database of the player tracking system, the spending record of the player and a maximum spend limit associated with the player;

compare a difference between the spending record of the player and the maximum spend limit of the player to each of i) a first predefined fixed value of a first fixed price gaming ticket ii) a second predefined fixed value of a second fixed price gaming ticket, and iii) a third predefined fixed value of a third fixed price gaming ticket, wherein the second predefined fixed value of the second fixed price gaming ticket is less than the first predefined fixed value of the first fixed price gaming ticket, and wherein the third predefined fixed value of the third fixed price gaming ticket is less than the second predefined fixed value of the second fixed price gaming ticket;

determine, based upon the comparing, that the difference exceeds the first predefined fixed value and does not exceed the second predefined fixed value, wherein the determination is independent of a current balance of funds in a player account;

display, via the TM display, the second fixed price gaming ticket and the third fixed price gaming ticket as available for purchase by the player;

receive, via the TM input interface, a player selection of at least one of the fixed price gaming tickets available for purchase;

receive payment for the selected fixed price gaming ticket via a TM payment module, the selected fixed price gaming ticket being redeemable at a cashless-enabled gaming machine for a corresponding amount of wagerable credits;

generate updated spending record data in the player tracking database based on the predefined fixed value of the selected fixed price gaming ticket;

transmit the updated spending record data to the player tracking system for updating the spending record; and dispense, via the ticket dispensing device, the selected fixed price gaming ticket to the player responsive to receiving the payment.

13. The system as claimed in claim 12, the instructions when executed by the TM processor further causing the TM processor to receive data identifying the maximum spend limit associated with the player.

14. The system as claimed in claim 13, wherein the player tracking system is configured to record the spending record of the player and the maximum spending limit associated with the player against a player record maintained by the player tracking system.

15. The system as claimed in claim 14, the instructions when executed by the TM processor further causing the TM processor to evaluate an amount of credits wagered by the player over a predefined period of time when determining which of the plurality of fixed price gaming tickets are available for purchase.

16. The system as claimed in claim 15, the instructions when executed by the TM processor further causing the TM processor to evaluate a number of credits associated with the player that are yet to be redeemed when determining which of the plurality of fixed price gaming tickets are available for purchase.

17. The system as claimed in claim 12, wherein the at least one of the plurality of EGMs is a cashless-enabled electronic gaming machine on which the dispensed fixed price gaming tickets can be redeemed.

18. The system as claimed in claim 12, the instructions when executed by the TM processor further causing the TM processor to:

receive the payment for the selected fixed price gaming ticket via the TM payment module implemented as a credit input device of a first of the plurality of EGMs.

19. The system as claimed in claim 12, the instructions when executed by the TM processor further causing the TM processor to:

receive the payment for the selected fixed price gaming ticket via the TM payment module implemented as a credit input device of a standalone ticketing device in networked communication with the player tracking system, the standalone ticketing device separate from the plurality of EGMs.

* * * * *